(12) United States Patent
Verbeke et al.

(10) Patent No.: US 11,338,729 B2
(45) Date of Patent: May 24, 2022

(54) COMMUNICATION OF AUTONOMOUS VEHICLE ACTIONS

(71) Applicant: HARMAN INTERNATIONAL INDUSTRIES, INCORPORATED, Stamford, CT (US)

(72) Inventors: Joseph Verbeke, San Francisco, CA (US); Stefan Marti, Oakland, CA (US); Sven Kratz, Saratoga, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 0 days.

(21) Appl. No.: 16/993,170

(22) Filed: Aug. 13, 2020

(65) Prior Publication Data

US 2022/0048429 A1 Feb. 17, 2022

(51) Int. Cl.
*B60Q 1/50* (2006.01)
*H04W 4/44* (2018.01)

(52) U.S. Cl.
CPC ............. *B60Q 1/50* (2013.01); *H04W 4/44* (2018.02)

(58) Field of Classification Search
CPC .......... B60Q 1/503; B60Q 1/50; B60Q 1/525; B60Q 5/006; G05D 1/021; G05D 2201/0213; G08G 1/096791; G08G 1/163; G08G 1/166; G08G 1/22; H04W 4/44
See application file for complete search history.

(56) References Cited

U.S. PATENT DOCUMENTS

| 9,481,287 | B2 | 11/2016 | Marti et al. | |
| 2018/0093607 | A1* | 4/2018 | Omanovic | B60Q 1/38 |
| 2018/0334089 | A1* | 11/2018 | Huang | B60Q 5/006 |
| 2019/0161084 | A1* | 5/2019 | Greenwood | B60W 10/06 |
| 2019/0184893 | A1* | 6/2019 | Sorokin | B60Q 1/503 |

* cited by examiner

*Primary Examiner* — Omeed Alizada
(74) *Attorney, Agent, or Firm* — Artegis Law Group, LLP

(57) ABSTRACT

Techniques for communication of autonomous vehicle actions include receiving an intended driving action associated with an autonomous vehicle, determining an intent communication scenario associated with the autonomous vehicle, and based on the intent communication scenario, causing a visualization indicating the intended driving action to be projected onto a roadway.

20 Claims, 14 Drawing Sheets

COMMUNICATION OF AUTONOMOUS VEHICLE ACTIONS

BACKGROUND

Field of the Various Embodiments

The disclosed embodiments relate generally to autonomous vehicles and, more specifically, to techniques for communicating autonomous vehicle actions.

Description of the Related Art

When driving a vehicle on a road, a human driver may encounter various situations where he or she may engage in non-verbal communication with other people sharing the road. For example, at an intersection with a four-way stop, drivers of vehicles stopping the intersection may look at each other to coordinate a sequence of driving through the intersection. As another example, a driver of a vehicle may perform an arm waving gesture to a pedestrian attempting to cross at an unmarked intersection to signal that the driver is yielding to the pedestrian. As a further example, a driver of one vehicle may perform an arm waving gesture to a driver of another vehicle behind him, to signal the another driver that she may proceed with a passing maneuver.

In recent years, there has been increased interest and growth in the field of autonomous driving technologies (e.g., self-driving, driverless, or autonomous vehicles). Autonomous driving technologies offer great promise in various transportation applications, including for example trucking and vehicles for hire. However, a drawback of autonomous driving technologies is that these technologies typically do not communicate vehicle driving actions outside of the vehicle. A human vehicle driver is absent or not otherwise actively involved in operation of a vehicle operated by autonomous driving technologies. Without involvement of the human driver, the non-verbal communications with other drivers and pedestrians that help coordinate road sharing are absent. Accordingly, human drivers and pedestrians are typically unaware and uncertain of what driving actions a vehicle operated by autonomous driving technologies may perform. With this lack of awareness, certainty, and coordination, sharing the road with vehicles operated by autonomous driving technologies becomes difficult.

As the foregoing illustrates, what is needed are more effective techniques for communicating actions to be performed by an autonomous vehicle.

SUMMARY

One embodiment sets forth a computer-implemented method including receiving an intended driving action associated with an autonomous vehicle, determining an intent communication scenario associated with the autonomous vehicle, and based on the intent communication scenario, causing a visualization indicating the intended driving action to be projected onto a roadway.

Further embodiments provide, among other things, one or more computer-readable storage media and a system configured to implement the methods set forth above.

A technical advantage and improvement of the disclosed techniques is that intended actions of an autonomous vehicle on the road are communicated to human drivers and pedestrians in proximity. Accordingly, the human drivers and pedestrians can coordinate their actions with the intended actions of the autonomous vehicle, thereby facilitating more effective sharing of the road between humans and autonomous vehicles. Another technical advantage and improvement is that the intended actions may be communicated by in-proximity vehicles and/or devices, in addition or alternatively to the autonomous vehicle. This increases the communication capability of the system and facilitates more effective communication of the intended actions.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
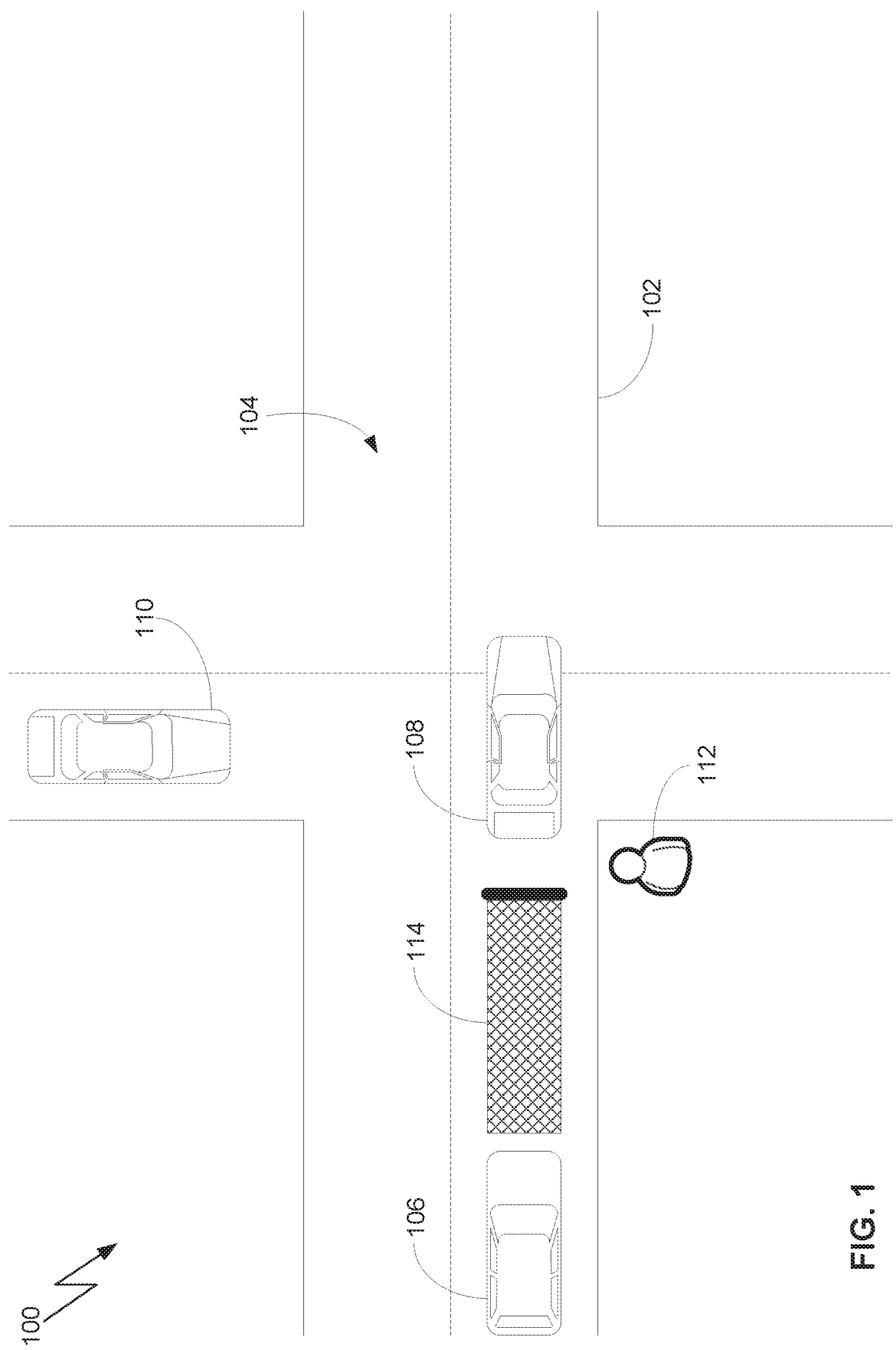
FIG. 1 illustrates a driving environment according to various embodiments.

FIG. 1 illustrates a driving environment 100 according to various embodiments. Driving environment 100 as shown includes a roadway intersection 104. Vehicle 108 has already entered intersection 104 along roadway 102, and vehicle 106 is approaching intersection 104. A vehicle 110 is stopped near intersection 104 on a roadway perpendicular to roadway 102. A pedestrian 112 is standing on a sidewalk near intersection 104.

In various embodiments, vehicle 106 is an autonomous vehicle. As used herein, an autonomous vehicle, or "AV," is a vehicle that is capable of autonomous operation, which includes sensing the environment around the vehicle and moving safely with little or no human input. Accordingly, examples of AVs include, without limitation, a fully autonomous vehicle and a vehicle that is capable of operating in either an autonomous mode (autonomous operation) or manual mode (operated by a human). In various embodiments, AVs may also be referred to as self-driving vehicles or driverless vehicles. In some embodiments, vehicle 106 is a vehicle that is capable of autonomous operation with a degree of human supervision or input (e.g., a human is present to select the destination, a human can take over operation in an emergency). In various embodiments, each of vehicles 108 and 110 may be an AV operating in autonomous mode, an AV operating in manual mode, or a vehicle not capable of autonomous operation.

In conventional vehicles operated by human drivers, a human driver can engage in non-verbal communications with other human drivers and/or other people sharing the road (e.g., pedestrians, bicyclists, etc.) to coordinate driving actions taken to drive the vehicle. For example, if intersection 104 is a four-way stop, and vehicles 108 and 110 are both operated by human drivers and are stopped at intersection 104 at approximately the same time, both human drivers may make eye contact with each other, or one of them may wave the other through, to coordinate which of vehicles 108 and 110 may proceed through intersection 104 first. Accordingly, human drivers, as well as pedestrians, bicyclists, etc. can coordinate sharing of the road via non-verbal communications. However, when an AV shares the road with human drivers, pedestrians, etc., non-verbal communication is not available for coordinating driving actions because of the lack or non-involvement of a human driver in the AV.

To address these issues, an intended driving action of an AV (e.g., vehicle 106) can be communicated via a visualization 114 (e.g., an image) projected onto roadway 102. Visualization 114 may be projected for viewing by human drivers, pedestrians, bicyclists, and so forth (e.g., human drivers of vehicles 108, 110; pedestrian 112) in proximity of vehicle 106. As used herein, an intended driving action is an action that vehicle 106 plans to take in the immediate future with respect to driving the vehicle. Examples of intended driving action include, without limitation, stopping at an upcoming stop sign, speeding up, slowing down, making a U-turn at an upcoming intersection, making a passing maneuver to pass a vehicle ahead, and so forth. Vehicle 106 can project visualization 114. Alternatively, another vehicle or projection system in proximity to vehicle 106 (e.g., vehicle 108, an overhead drone, a projection system on a street lamp or traffic light) can project visualization 114 on behalf of vehicle 106, based on information received from vehicle 106. Additionally or alternatively, a visualization of the intended driving action can be displayed on a display device of a computing device as extended reality (e.g., augmented reality) content in conjunction with an image (e.g., live video) of vehicle 106 travelling on roadway 102. The computing device displaying the extended reality visualization may be associated with a vehicle (e.g., vehicle 108 and/or 110) or a person (e.g., a device carried or worn by pedestrian 112) in proximity of vehicle 106. Vehicle 106 can detect nearby vehicles and/or devices and communicate with those nearby vehicles and/or devices. Vehicle 106 can determine whether it will self-project the visualization indicating the intended driving action, request a nearby vehicle or projection system to project the visualization on its behalf, or have the visualization be displayed on a display device associated with a nearby vehicle and/or a nearby user. Further details regarding these features are described below.

Figure 2:
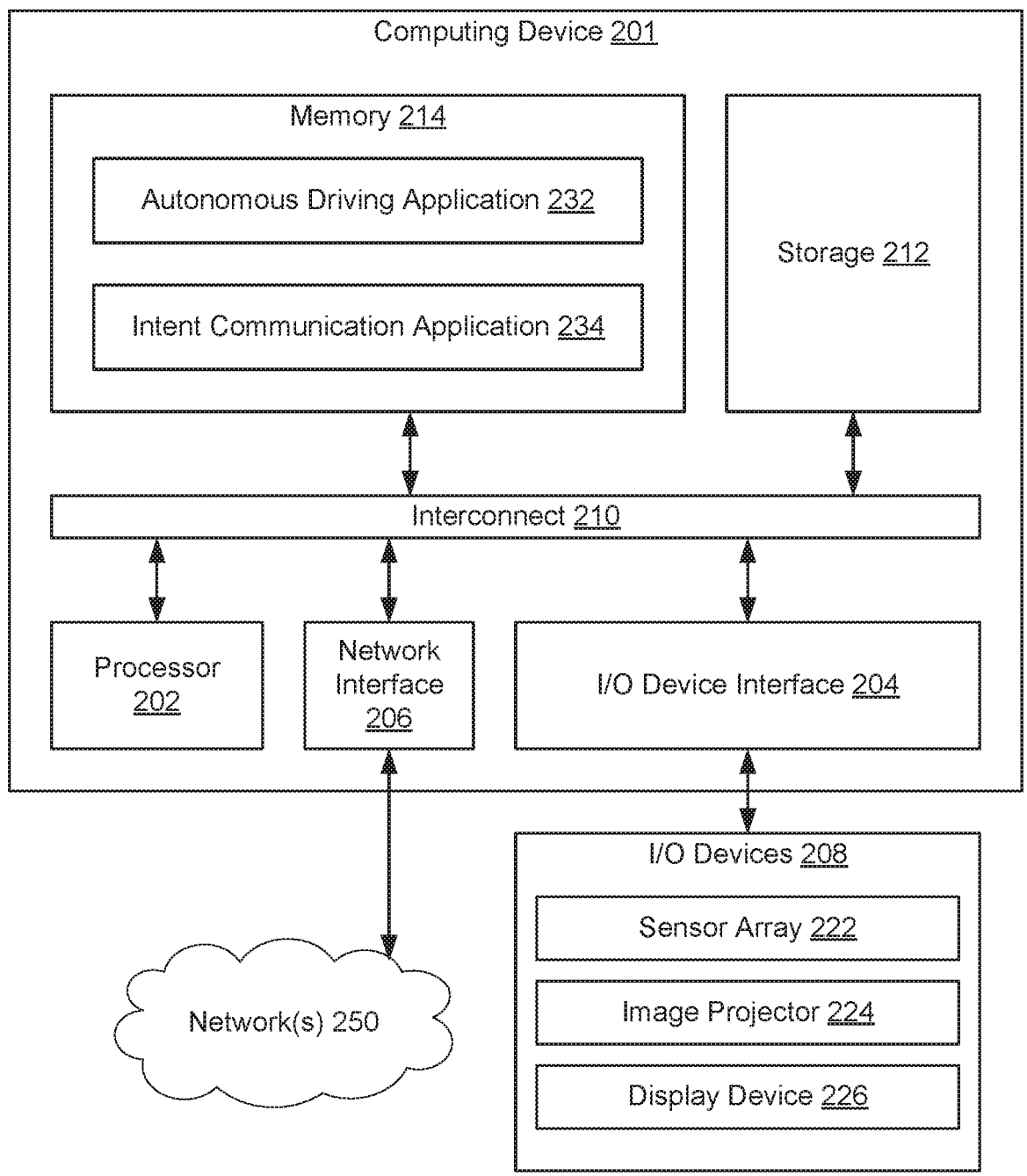
FIG. 2 illustrates a computing system configured to implement one or more aspects of the various embodiments.

FIG. 2 illustrates a computing system 200 configured to implement one or more aspects of the various embodiments. In various embodiments, computing system 200 is implemented in a vehicle (e.g., vehicle 106, 108, or 110). Examples of computing system 200 implemented in a vehicle include, without limitation, a head unit of a vehicle or an infotainment system of the vehicle. In some embodiments, computing system 200 may be implemented in another device or system (e.g., an overhead drone, a projection system on a street lamp or traffic light). Computing system 200 includes, without limitation, computing device 201, input/output (I/O) device(s) 208, and optionally network(s) 250. Computing device 201 includes a processor 202, I/O device interface 204, network interface 206, interconnect 210 (e.g., a bus), storage 212, and memory 214. Memory 214 stores an intent communication application 234, and in vehicles that are capable of autonomous operation, autonomous driving application 232. Processor 202 and memory 214 may be implemented in any technically feasible fashion. For example, and without limitation, in various embodiments, any combination of processor 202 and memory 214 may be implemented as a stand-alone chip or as part of a more comprehensive solution that is implemented as an application-specific integrated circuit (ASIC), a system-on-a-chip (SoC), and/or the like. Processor 202, I/O device interface 204, network interface 206, storage 212, and memory 214 can be communicatively coupled to each other via interconnect 210.

The one or more processors 202 may include any suitable processor, such as a central processing unit (CPU), a graphics processing unit (GPU), an application-specific integrated circuit (ASIC), a field programmable gate array (FPGA), a tensor processing unit (TPU), any other type of processing unit, or a combination of multiple processing units, such as a CPU configured to operate in conjunction with a GPU. In general, each of the one or more processors 202 may be any technically feasible hardware unit capable of processing data and/or executing software applications and modules.

Storage 212 may include non-volatile storage for applications, software modules, and data, and may include fixed or removable disk drives, flash memory devices, and CD-ROM, DVD-ROM, Blu-Ray, HD-DVD, or other magnetic, optical, solid state storage devices, and/or the like.

Memory 214 may include a random access memory (RAM) module, a flash memory unit, or any other type of memory unit or combination thereof. The one or more processors 202, I/O device interface 204, and network interface 206 are configured to read data from and write data to memory 214. Memory 214 includes various software programs and modules (e.g., an operating system, one or more applications) that can be executed by processor 202 and application data (e.g., data loaded from storage 212) associated with said software programs.

In some embodiments, computing device 201 is communicatively coupled to one or more networks 250. Network(s) 250 may be any technically feasible type of communications network that allows data to be exchanged between computing device 201 and remote systems or devices (not shown), such as a server, a cloud computing system, or other computing device or system. For example, network 250 may include a wide area network (WAN), a local area network (LAN), a wireless network (e.g., a Wi-Fi network, a cellular data network), an ad-hoc network, a peer-to-peer network, and/or the Internet, among others. Computing device 201 may connect with network(s) 250 via network interface 206. In some embodiments, network interface 206 is hardware, software, or a combination of hardware and software, that is configured to connect to and interface with network(s) 250.

In some embodiments, computing device 201 can detect other computing devices 201 (e.g., in other vehicles) and/or computing devices (not shown) in proximity. For example, computing device 201 at vehicle 106 could broadcast a message and wait for acknowledgements other computing devices in proximity. Computing device 201 can establish an ad-hoc, peer-to-peer network with such devices that are detected. More generally, computing device 201 can detect other computing devices in proximity, and communicatively couple with such devices in any technically feasible manner wirelessly (e.g., Bluetooth, ad-hoc Wi-Fi, visible light communication (VLC)) via network interface 206 (e.g., via network(s) 250).

I/O devices 208 may include devices capable of providing input, as well as devices capable of providing output, such as a display device, audio output device, etc. In various embodiments, I/O devices 208 include sensor array 222, visualization projector 224, and optionally a display device 226. Examples of display devices 226 include, without limitation, LCD displays, LED displays, touch-sensitive displays, transparent displays, heads-up displays, head-mounted displays (e.g., augmented reality glasses or a consumer augmented reality device that is paired and/or tethered to the vehicle), projection systems, and/or the like. In some embodiments, display device 226 implemented in a vehicle can be a heads-up display or a center console display capable of displaying extended reality (e.g., augmented reality) content. I/O devices 208 may further include other input and/or output devices, such as a microphone, an audio output device (e.g., speakers), buttons, knobs, dials, touch-sensitive surfaces, etc. Additionally, I/O devices 208 may include devices capable of both receiving input and providing output, such as a touch-sensitive display, and/or the like.

In various embodiments, sensor array 222 is an array of different sensors configured to measure various properties associated with the environment that surrounds the vehicle in which computing device 201 is implemented. Sensor array 222 may include cameras, optical sensors, ultrasound sensors, SONAR and/or LIDAR sensors, depth sensors, stereoscopic imaging sensors, topography mapping sensors, and so forth. In some embodiments, sensor array 222 is configured to record sensor data in a 360° panorama surrounding the vehicle and transmit that data to computing device 201 for processing.

In various embodiments, image projector 224 is an optical projection system configured to emit light onto a projectable area in proximity of the vehicle to create images within that area. The projected images may include text, arrows, polygons, line drawings, or any other type of image. Image projector 224 may be a laser projection system, a scanning laser or laser scanner projection system, a liquid crystal display (LCD) projector, a three-dimensional (3D) projector, a video projector, a gobo projector, or any technically feasible system capable of projecting images onto a surface. Image projector 224 is configured to project images that are generated by computing device 201 to communicate an intended driving action of an autonomous vehicle (e.g., the vehicle in which computing device 201 is implemented, on behalf of an autonomous vehicle in proximity).

In some embodiments, computing device 201 also includes a location device (not shown) for communicating with a global navigation satellite system (e.g., GPS, GLONASS, BeiDou) to determine a location of computing device 201, and by extension the location of the vehicle in which computing device 201 is implemented.

Memory 214 includes an intent communication application 234 and optionally autonomous driving application 232. Depending on the particular device or system in which computing device 201 is implemented, autonomous driving application 232 may be omitted or left inactive. For example, if computing device 201 is implemented in a non-autonomous vehicle, autonomous driving application 232 may be omitted or left inactive. Intent communication application 234 and autonomous driving application 232 may be stored in and loaded from storage 212.

In operation, autonomous driving application 232 autonomously operates an AV (e.g., vehicle 106) in which computing device 201 is implemented. Autonomous driving application 232 receives sensor data of the environment from sensor array 222 and location data from a navigation system (not shown) and a location device. Based on the sensor data and location data, autonomous driving application 232 determines and generates one or more current driving actions for immediate operation of vehicle 106 and one or more intended driving actions for operating the vehicle 106 in the immediate future. For example, if part of the route includes a U-turn at an intersection, autonomous driving application 232 determines a driving action of driving vehicle 106 forward at constant speed to approach the intersection, and determines intended driving actions of slowing down near the intersection and making a U-turn at the intersection. Autonomous driving application 232 determines the driving actions to operate vehicle 106 using any technically feasible technique(s), including for example and without limitation, neural networks, object recognition algorithms, computer vision techniques, image processing, and so forth. Additionally, autonomous driving application 232 can provide information specifying the intended driving actions to intent communication application 234. For example, autonomous driving application 232 can transmit information indicating one or more upcoming intended driving actions to intent communication application 234 in a data feed.

In operation, intent communication application 234 can receive intended driving action information from autonomous driving application 232. Intent communication application 234 can determine, based on the intended driving action information, the appropriate visualization to communicate one or more upcoming intended driving actions externally, and then generate the visualization. The visualizations for various intended driving actions can be pre-defined (e.g., in a look-up table, in various rules). Intent communication application 234 can determine, via sensor data and location data, the current intent communication scenario for vehicle 106, including the terrain of the roadway and nearby environment, the presence of objects or other obstacles in the environment, and the current speed and direction of travel. More generally, the current intent communication scenario may include any parameter, characteristic, or circumstance that affects communication of the intended driving action (e.g., suitability of the AV to self-project a visualization communicating the intended driving action versus having another device project the visualization on behalf of the AV, where to project or display the visualization in order to have it seen by the appropriate viewers). Examples of such parameters, characteristics, and/or circumstances include, without limitation, the terrain of the roadway, the locations and/or types of objects and/or obstacles on the roadway, locations and/or orientations of other vehicles and persons in proximity, whether the intended driving action is particularly relevant to certain vehicles and/or persons in proximity, visualization projection and/or display capabilities in proximity (e.g., presence of other computing devices and/or projection systems nearby), and so forth. Intent communication application 234 can also determine, via sensor data and location data, the presence or not of other vehicles, pedestrians, etc. in proximity (e.g., within the range of sensor array 222).

Intent communication application 234 can further determine, via sensor data and wireless communications, the presence or not of other computing devices (e.g., within the wireless communication range of computing device 201). The wireless communications can include device discovery messages and associated responses, and messages querying visualization presentation capability (e.g., projection capability, extended reality display capability) and associated responses. Accordingly, based on received responses, intent communication application 234 at vehicle 106 becomes aware of the computing devices in proximity and the available visualization presentation capability (e.g., image projector, display device) amongst those computing devices.

Based on the current intent communication scenario for vehicle 106 and the presence of other vehicles, pedestrians, etc., and the presence of other computing devices and their visualization presentation capabilities, intent communication application 234 determines whether to self-project the visualization or transmit the intended driving action information and/or the visualization to another computing device, which may project or display the visualization. Intent communication application 234 also can determine a desired location for the visualization (e.g., where relative to vehicle 106 to project the visualization). For example, if I/O devices 208 include image projector 224 and there is no object in front of the vehicle 106, intent communication application 234 can determine that vehicle 106 should self-project the visualization in front of vehicle 106. As another example, if image projector 224 is disabled and another vehicle is in proximity and has a working image projector 224 coupled to a computing device similar to computing device 201, intent communication application 234 can determine that the visualization should be projected by the another vehicle, and which area relative to vehicle 106 to project the visualization, and accordingly transmits the intended driving action information and/or data corresponding to the visualization, including information indicating the desired location of the visualization, to the another vehicle (e.g., vehicle 108), where intent communication application 234 in that another vehicle can proceed to process the information and/or data and to project the visualization based on the information and/or data. As vehicle 106 continues to move, the visualization can move along with vehicle 106 and may change.

Figure 3:
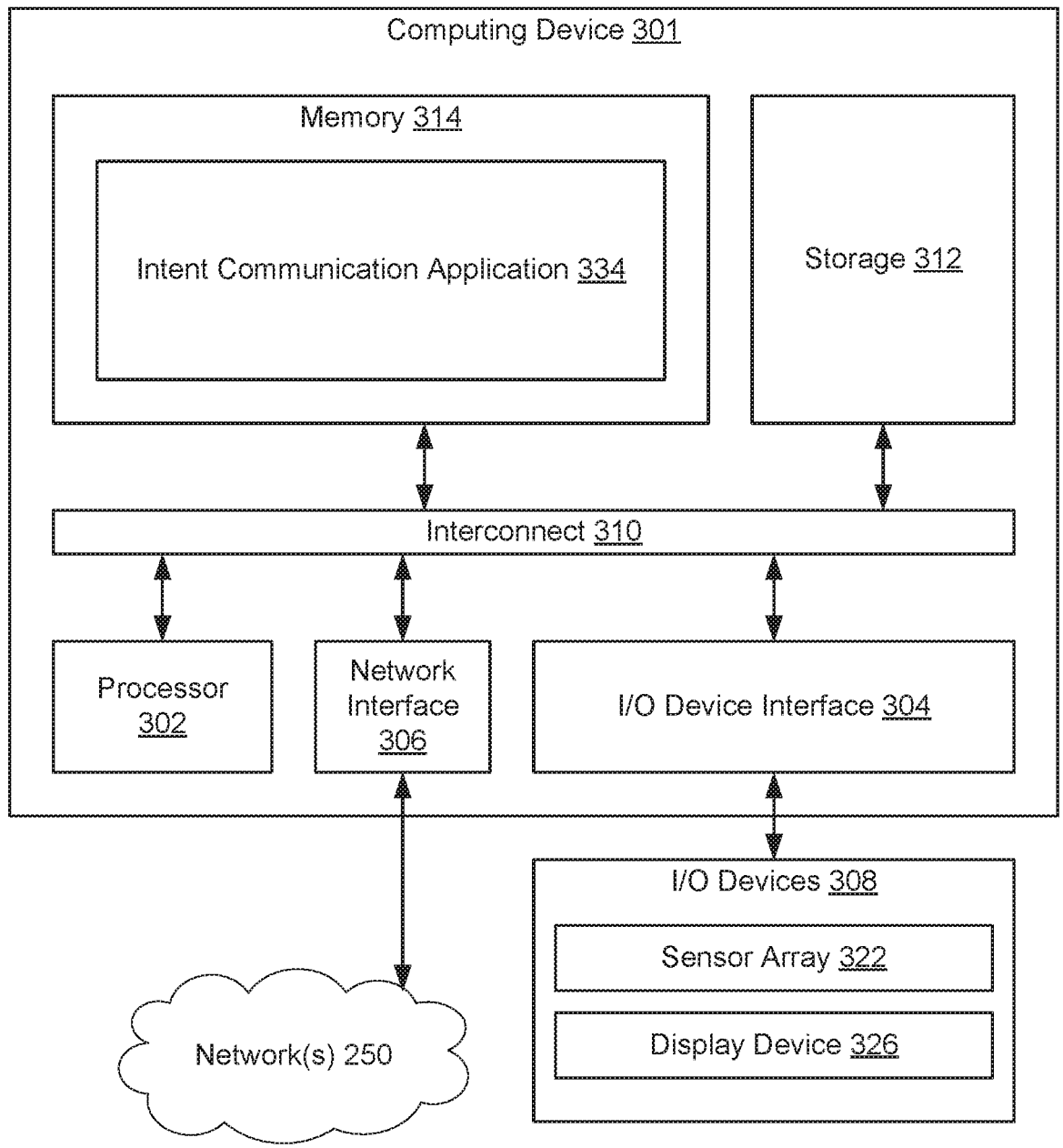
FIG. 3 illustrates another computing system configured to implement one or more aspects of the various embodiments.

FIG. 3 illustrates a computing system 300 configured to implement one or more aspects of the various embodiments. In various embodiments, computing system 300 is carried or worn by a user (e.g., pedestrian 112). Examples of computing system 300 that are carried or worn include, without limitation, a mobile device (e.g., a smartphone, a tablet computer) or a wearable device (e.g., smart glasses, a headset). In some embodiments, computing system 300 may be implemented in a vehicle. Computing system 300 includes, without limitation, a computing device 301, input/output (I/O) device(s) 308, and optionally network(s) 250. Computing device 301 includes a processor 302, I/O device interface 304, network interface 306, interconnect 310 (e.g., a bus), storage 312, and memory 314. Memory 314 stores an intent communication application 334. Processor 302 and memory 314 may be implemented in any technically feasible fashion. For example, and without limitation, in various embodiments, any combination of processor 302 and memory 314 may be implemented as a stand-alone chip or as part of a more comprehensive solution that is implemented as an application-specific integrated circuit (ASIC), a system-on-a-chip (SoC), and/or the like. Processor 302, I/O device interface 304, network interface 306, storage 312, and memory 314 can be communicatively coupled to each other via interconnect 310.

The one or more processors 302 may include any suitable processor, such as a central processing unit (CPU), a graphics processing unit (GPU), an application-specific integrated circuit (ASIC), a field programmable gate array (FPGA), a tensor processing unit (TPU), any other type of processing unit, or a combination of multiple processing units, such as a CPU configured to operate in conjunction with a GPU. In general, each of the one or more processors 302 may be any technically feasible hardware unit capable of processing data and/or executing software applications and modules.

Storage 312 may include non-volatile storage for applications, software modules, and data, and may include fixed or removable disk drives, flash memory devices, and CD-ROM, DVD-ROM, Blu-Ray, HD-DVD, or other magnetic, optical, solid state storage devices, and/or the like.

Memory 314 may include a random access memory (RAM) module, a flash memory unit, or any other type of memory unit or combination thereof. The one or more processors 302, I/O device interface 304, and network interface 306 are configured to read data from and write data to memory 314. Memory 314 includes various software programs and modules (e.g., an operating system, one or more applications) that can be executed by processor 302 and application data (e.g., data loaded from storage 312) associated with said software programs.

In some embodiments, computing device 301 is communicatively coupled to the one or more networks 250. As described above, network(s) 250 may be any technically feasible type of communications network that allows data to be exchanged between computing device 301 and remote systems or devices (not shown), such as a server, a cloud computing system, or other computing device or system. For example, network 250 may include a wide area network (WAN), a local area network (LAN), a wireless network (e.g., a Wi-Fi network, a cellular data network), an ad-hoc network, a peer-to-peer network, visible light communication), and/or the Internet, among others. Computing device 301 may connect with network(s) 250 via network interface 306. In some embodiments, network interface 306 is hardware, software, or a combination of hardware and software, that is configured to connect to and interface with network(s) 250.

In some embodiments, computing device 301 can communicate with a computing device 201 in an AV (e.g., vehicle 106) in proximity. For example, computing device 201 in vehicle 106 could broadcast a message and wait for acknowledgements from other computing devices 201 and 301 in proximity. Computing device 301 can join an ad-hoc, peer-to-peer network with such devices that are detected. More generally, computing device 201 in vehicle 106 can detect other computing devices 201 and/or computing devices 301 in proximity, and computing device 301 can communicatively couple with such devices in any technically feasible manner wirelessly (e.g., Bluetooth, ad-hoc Wi-Fi, VLC) via network interface 306 (e.g., via network(s) 250).

I/O devices 308 may include devices capable of providing input, as well as devices capable of providing output, such as a display device, audio output device, etc. In various embodiments, I/O devices 308 include sensor array 322, and a display device 326. Examples of display devices 326 include, without limitation, LCD displays, LED displays, touch-sensitive displays, transparent displays, heads-up displays, head-mounted displays, projection systems, and/or the like. I/O devices 308 may further include other input and/or output devices, such as a microphone, an audio output device (e.g., speakers), buttons, knobs, dials, touch-sensitive surfaces, etc. Additionally, I/O devices 308 may include devices capable of both receiving input and providing output, such as a touch-sensitive display, and/or the like.

In various embodiments, sensor array 322 is an array of different sensors configured to measure various properties associated with the environment that surrounds computing system 300. Sensor array 322 may include cameras, optical sensors, ultrasound sensors, SONAR and/or LIDAR sensors, depth sensors, stereoscopic imaging sensors, topography mapping sensors, and so forth. In some embodiments, sensor array 322 is configured to record sensor data in a direction along a field of view (e.g., a field of view of a camera within sensor array 322) and transmit that data to computing device 301 for processing.

In some embodiments, computing device 301 also includes a location device (not shown) for communicating with a global navigation satellite system (e.g., GPS, GLONASS, BeiDou) to determine a location of computing device 301.

Memory 314 includes an intent communication application 334. Intent communication application 334 may be stored in and loaded from storage 312.

In operation, intent communication application 334 can receive intended driving action information and/or content indicating the intended driving action (e.g., data corresponding to a visualization) from a computing device 201 implemented at an AV (e.g., from intent communication application 234 at vehicle 106). Intent communication application 334 can determine, based on the intended driving action information, the appropriate visualization to communicate one or more upcoming intended driving actions externally, and then generate the visualization. Alternatively, intent communication application 334 receives the data corresponding to the visualization, generated by intent communication application 234 at vehicle 106. The visualizations for various intended driving actions can be predefined (e.g., in a look-up table, in various rules).

Intent communication application 334 can determine, via sensor data and location data, the current intent communication scenario of vehicle 106, including the terrain of the roadway and nearby environment, and the current speed and direction of travel. Intent communication application 334 can determine, via sensor data and location data, location of vehicle 106. Intent communication application 334 further captures an image or images (e.g., live video) of vehicle 106 moving on the roadway. Based on the current intent communication scenario, location, and images of vehicle 106, intent communication application 334 displays the visualization of the intended driving action on display device 326 in conjunction with the images of vehicle 106. For example, the intent communication application 334 could display the visualization as augmented reality content over the images of vehicle 106 moving. As vehicle 106 continues to move, the visualization can move along with vehicle 106 and may change.

Figure 4:
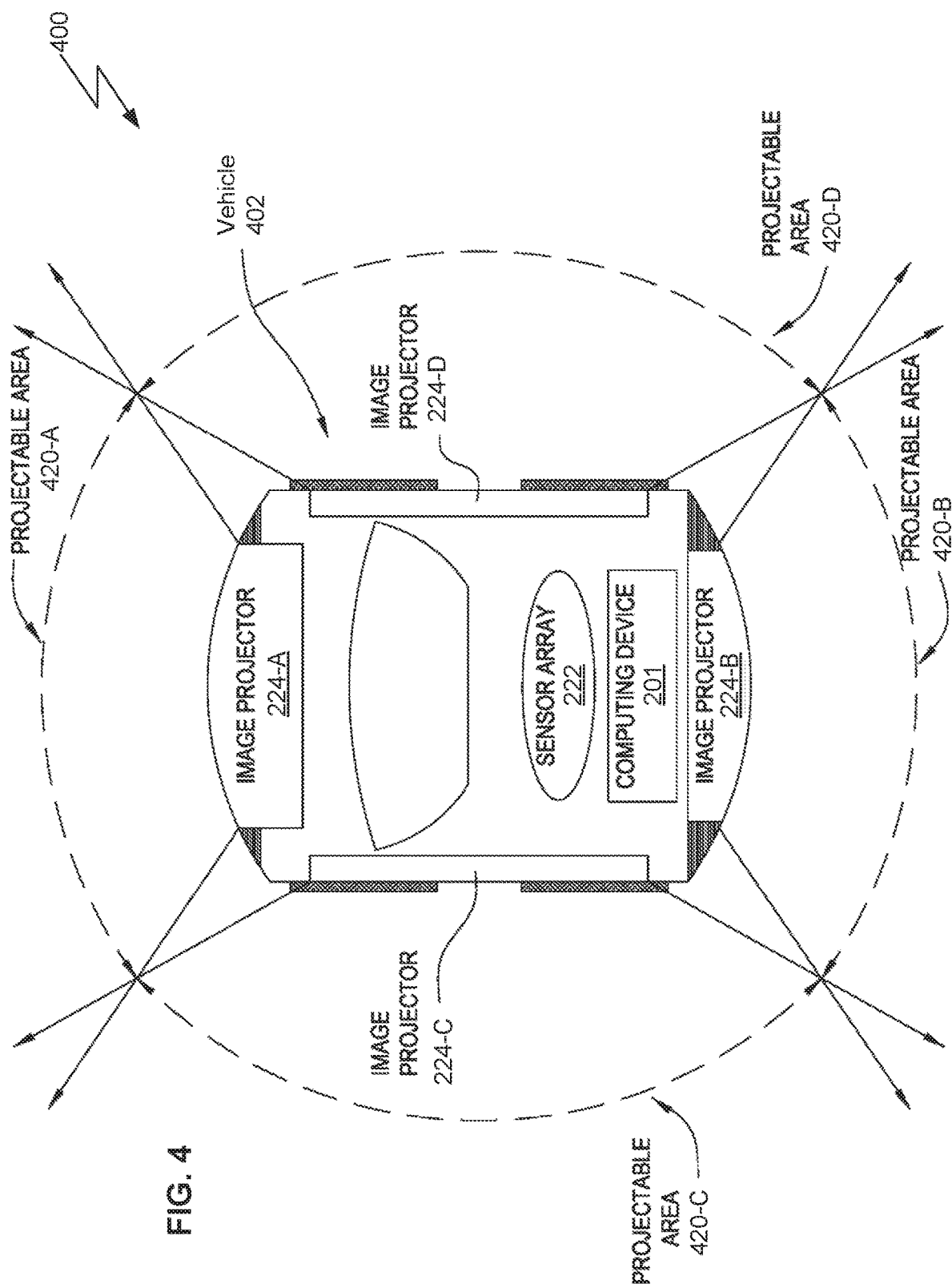
FIG. 4 illustrates a roadway projection system according to various embodiments.

FIG. 4 illustrates a roadway projection system 400 according to various embodiments. As shown, roadway projection system 400 is integrated into a vehicle 402 (e.g., vehicle 106, 108, or 110) and is configured to project images onto a projectable area 420 for display outside of vehicle 402 (e.g., to human drivers of nearby vehicles and to nearby pedestrians). In operation, projectable area 420 typically includes portions of a roadway on which vehicle 402 travels and/or surfaces residing along that roadway. Roadway projection system 400 projects images onto that roadway and/or surfaces along the roadway to communicate an intended driving action of vehicle 402 or of another vehicle in proximity. Such images provide a visualization of specific driving actions, including for example and without limitation speeding up, slowing down, maintaining speed, a turning maneuver, a U-turn maneuver, a passing maneuver, coming to a stop at a certain position, merging, and so forth. Roadway projection system 400 includes image projector(s) 224, sensor array 222, and computing device 201.

An intent communication application 234 at computing device 201 can receive intended driving action information from autonomous driving application 232, and intent communication application 234 can generate a visualization indicating the intended driving action. Intent communication application 234 can also receive, from another AV in proximity, intended driving action information and/or a corresponding visualization.

In order to project a visualization onto projectable area 420, computing device 201 (e.g., intent communication application 234) first identifies that projectable area from within the environment that surrounds vehicle 402 based on sensor data. In doing so, computing device 201 processes the sensor data and identifies non-projectable surfaces proximate to vehicle 402, including humans, objects on which a projected image may be illegible and/or confusing, and highly reflective surfaces, among other surfaces onto which images should not be projected. Computing device 201 then determines projectable area 420 as the portion of the surrounding environment that excludes those non-projectable surfaces. Computing device 201 may also determine projectable area 420 based on a range parameter associated with image projector 224. Computing device 201 then processes sensor data associated with projectable area 420 (e.g., via a projection mapping method) to identify terrain variations that could potentially distort images projected thereto. Computing device 201 may further determine a location of the vehicle associated with the intended driving action, if computing device 201 is projecting the visualization on behalf of another vehicle.

Computing device 201 then can adjust the visualization for projection onto projectable area 420 that accounts for the identified terrain variations and the location of the vehicle associated with the intended driving action, and avoids non-projectable surfaces. Then, computing device 201 causes image projector 224 to project an image of the visualization onto projectable area 420. In some embodiments, the visualization may be projected onto projectable area 420 according to a projection mapping method that maps the visualization onto a non-planar terrain. In some embodiments, the projection mapping may be performed as part of the adjustment of the visualization to account for the terrain. In some embodiments, the adjustment of the visualization also accounts for a specific viewer in proximity. That is, the adjustment of the visualization can account for the position and orientation of a particular person in proximity for which indication of the intended driving action is relevant (e.g., a pedestrian waiting to cross a road on which the AV is travelling), so that the visualization as projected is more legible to the particular person. Once the image is projected, sensor array 222 may capture data that reflects the projected image and feed that data back into computing device 201. Computing device 201 may then modulate the image, as needed, to correct distortions, re-position the image, etc.

As shown in FIG. 4, roadway projection system 400 is configured to project images in a 360° panorama that surrounds vehicle 402. As shown, roadway projection system 400 includes image projectors 224-A and 224-B that are configured to project images onto projectable areas 420-A and 420-B. In addition, roadway projection system 400 also includes image projectors 224-C and 224-D that are configured to project images onto projectable areas 420-C and 420-D, respectively, that reside on either side of vehicle 402. Image projectors 224-A through 224-D generally operate in conjunction with sensor array 222 and computing device 201. With the configuration described herein, roadway projection system 400 may project images within an area that substantially surrounds vehicle 402.

Although FIG. 4 illustrates a specific configuration of roadway projection system 400, persons skilled in the art will recognize that the general functionality described thus far may also be implemented by other configurations of roadway projection system 400. In particular, roadway projection system 400 may also be configured to project images onto less than a 360° panorama that surrounds vehicle 402 (e.g., just onto 420-A in front of and/or 420-B behind vehicle 402).

Figure 5:
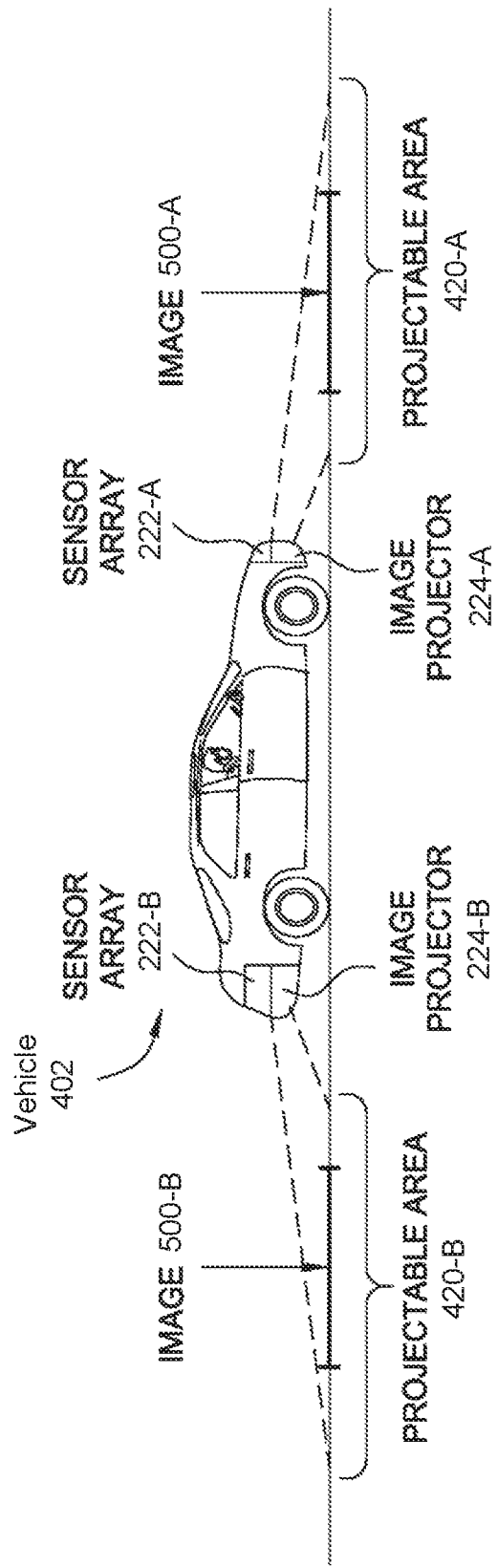
FIG. 5 illustrates the roadway projection system of FIG. 4 projecting a visualization onto a roadway, according to various embodiments.

Referring generally to FIG. 4, various components of roadway projection system 400 may be integrated into vehicle 402 in a variety of different locations in order to implement the functionality described thus far. FIG. 5 illustrates an exemplary integration of roadway projection system 400 into vehicle 402. In some embodiments, roadway projection system 400 may be integrated into devices other than vehicles such as vehicles 106, 108, or 110. In some examples, roadway projection system 400 may be mounted on street lights, traffic lights, buildings, bridges, and/or the like located near a roadway. In some examples, roadway projection system 400 may be mounted in aerial vehicles, such as drones. In some examples, roadway projection system 400 be integrated into the roadway itself.

FIG. 5 illustrates an integration of roadway projection system 400 where image projectors 224 and sensor array 222 are included at least within the front and rear of vehicle 402. As shown, image projector 224-A is integrated into a front bumper of vehicle 402 and configured to project an image 500-A within projectable area 420-A. Sensor array 222-A is similarly integrated and configured to measure properties of a portion of the environment that resides ahead of vehicle 402, including image 500-A. As also shown, image projector 224-B is integrated into a rear bumper of vehicle 402 and configured to project an image 500-B within projectable area 420-B. Sensor array 222-A is similarly integrated and configured to measure properties of a portion of the environment that resides behind vehicle 402, including image 500-B. Roadway projection system 400 may also be integrated into vehicle 402 to provide 360° projection capabilities.

Referring generally to FIGS. 4-5, persons skilled in the art will recognize that the different configurations and integrations discussed in conjunction with those figures are provided for exemplary purposes only. Persons skilled in the art will further understand that any arrangement of components that allows roadway projection system 400 to both project images and record sensor data within some or all of a 360° panorama surrounding vehicle 402 falls within the scope of the various embodiments. Further details regarding roadway projection systems are disclosed in U.S. Pat. No. 9,481,287, titled "Roadway Projection System" and filed on Jan. 21, 2014, the subject matter of which is incorporated by reference in its entirety. The images projected by roadway projection system 400 may communicate one or more intended driving actions of an AV externally (e.g., to other human drivers and pedestrians in proximity) in a wide variety of different intent communication scenarios and in a wide variety of visualizations, some (but not all) of which are described, by way of example, below in conjunction with FIGS. 6A-6H.

FIGS. 6A-6H illustrate exemplary intent communication scenarios where the roadway projection system of FIG. 4 projects a visualization onto a roadway to communicate an intended driving action, according to various embodiments. In FIGS. 6A-6H, the vehicle shown is an AV (e.g., vehicle 106) and is self-projecting a visualization to communicate its own intended driving action(s). FIGS. 6A-6H illustrate different types of visualizations that may be used for various intent communication scenarios.

In various embodiments, visualizations for intended driving actions may be predefined in a look-up table, a set of rules (e.g., rules mapping intended driving actions to visualizations), or the like. These look-up tables, rules, etc. may be stored in storage 212 and loaded into memory 214. The types of visualizations that may be used to communicate intended driving actions includes, for example and without limitation, a literal path projection, arrows, color coding, symbols, blinking, a countdown timer (e.g., timer counting down when the AV will come to a complete stop), and a position indicator (e.g., indicator of where the AV will come to a stop). Intended driving actions that may be communicated via visualizations include, for example and without limitation, directionality (e.g., continuing straight, turn left/right, U-turn, lane change), speed (e.g., constant speed, speed up, slow down), and various other intended driving actions (e.g., stop, passing a vehicle or obstacle, double parking for picking up or dropping off passengers). Table 1 below illustrates example mappings of intended driving actions to visualizations that may be specified in a look-up table, a set of rules, or the like:

TABLE 1

|  |  | Lines (thin or thick) | Arrows | Colored fillings | Symbol fillings |
|---|---|---|---|---|---|
| Directionality | Continue straight | Line pointing straight (following road) | Forward pointing arrow | | |
| | About to turn left/right | Curved line left/right | Arrow with left or right curvature, blinking | | |
| | About to change lane | S-shaped line | Animated arrow bending left/right | | |
| | About to take a U-turn | U-shaped line | Animated arrow bending 180 degrees | | |

TABLE 1-continued

| | | Lines (thin or thick) | Arrows | Colored fillings | Symbol fillings |
|---|---|---|---|---|---|
| Change in speed | Keep current speed | | | White | |
| | About to speed up | Dotted line with animation running forward | Animation of arrow lengthening | Green | "+" (plus) symbols |
| | About to slow down | Dotted line with animation running reverse | Animation of arrow shortening | Blue | "−" (minus) symbols |
| Other intended driving actions | About to stop | Animation of single dotted line splitting, morphing into T shape | | Red | |
| | About to pass vehicle in front | Straight line morphing into S shape | | | |

Figure 6C:
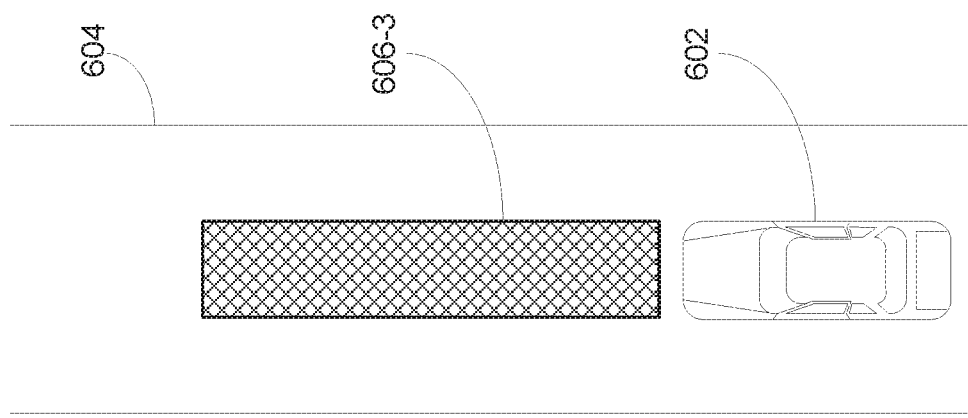
FIGS. 6A-6H illustrate exemplary intent communication scenarios where the roadway projection system of FIG. 4 projects a visualization onto a roadway to communicate an intended driving action, according to various embodiments.
Figure 6B:
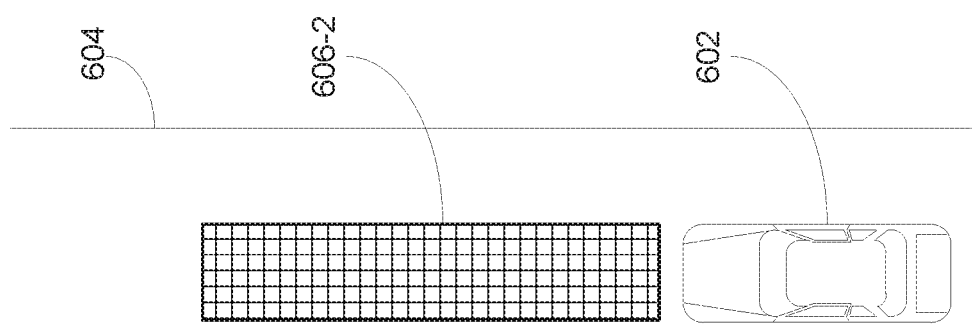
Figure 6A:
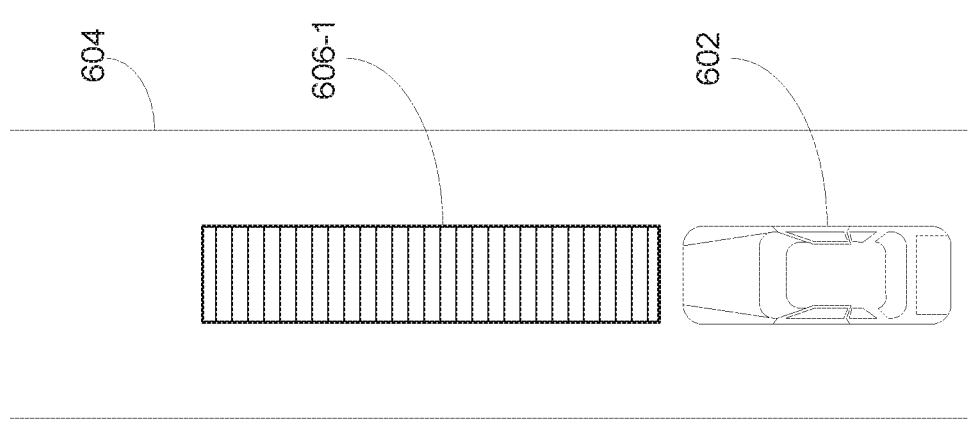

FIGS. 6A-6C illustrates one set of example visualizations 606 to indicate an intended driving action regarding speed changes. FIG. 6A illustrates vehicle 602 moving on road 604 and intending to maintain a constant speed. Vehicle 602 projects a visualization 606-1 onto road 604 in front of vehicle 602. Visualization 606-1 includes a rectangular region, in front of vehicle 602 and indicating the intended path of travel of vehicle 602, that is filled with a color predefined to indicate an intended constant speed (e.g., white according to Table 1 above).

FIG. 6B illustrates vehicle 602 moving on road 604 and intending to speed up. Vehicle 602 projects a visualization 606-2 onto road 604 in front of vehicle 602. Visualization 606-2 includes a rectangular region, in front of vehicle 602 and indicating the intended path of travel of vehicle 602, that is filled with a color predefined to indicate an intended speed increase (e.g., green according to Table 1 above).

FIG. 6C illustrates vehicle 602 moving on road 604 and intending to slow down. Vehicle 602 projects a visualization 606-3 onto road 604 in front of vehicle 602. Visualization 606-3 includes a rectangular region, in front of vehicle 602 and indicating the intended path of travel of vehicle 602, that is filled with a color predefined to indicate an intended speed decrease (e.g., blue according to Table 1 above). As shown in FIGS. 6A-6C, the different colors filling the rectangular region in visualization 606 are represented by the different fill patterns in the rectangular regions as depicted.

Figure 6E:
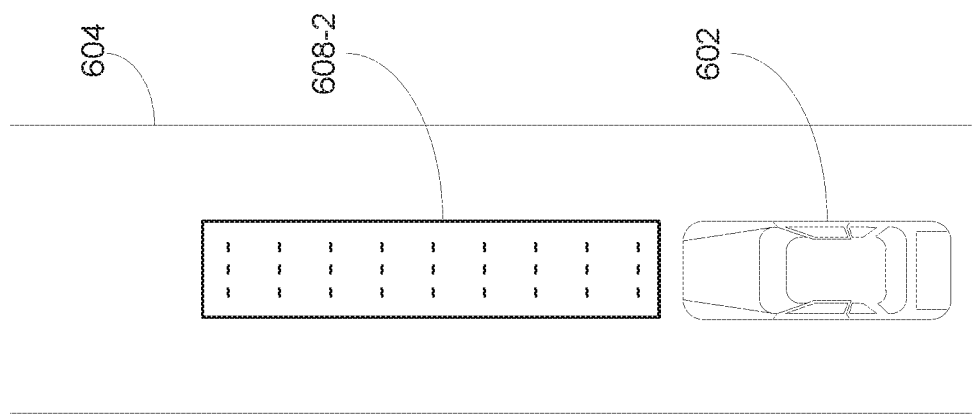
Figure 6D:
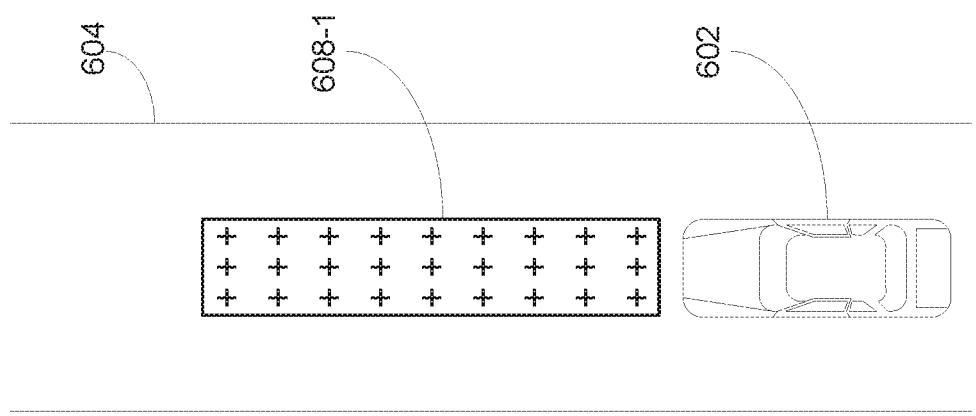

FIGS. 6D-6E illustrates another set of example visualizations 608 to indicate an intended driving action regarding speed changes. FIG. 6D illustrates vehicle 602 moving on road 604 and intending to speed up. Vehicle 602 projects a visualization 608-1 onto road 604 in front of vehicle 602. Visualization 608-1 includes a rectangular region, in front of vehicle 602 and indicating the intended path of travel of vehicle 602, that is filled with plus symbols to indicate an intended speed increase. FIG. 6E illustrates vehicle 602 moving on road 604 and intending to slow down. Vehicle 602 projects a visualization 608-2 onto road 604 in front of vehicle 602. Visualization 608-2 includes a rectangular region, in front of vehicle 602 and indicating the intended path of travel of vehicle 602, that is filled with minus symbols to indicate an intended speed decrease.

Figure 6F:
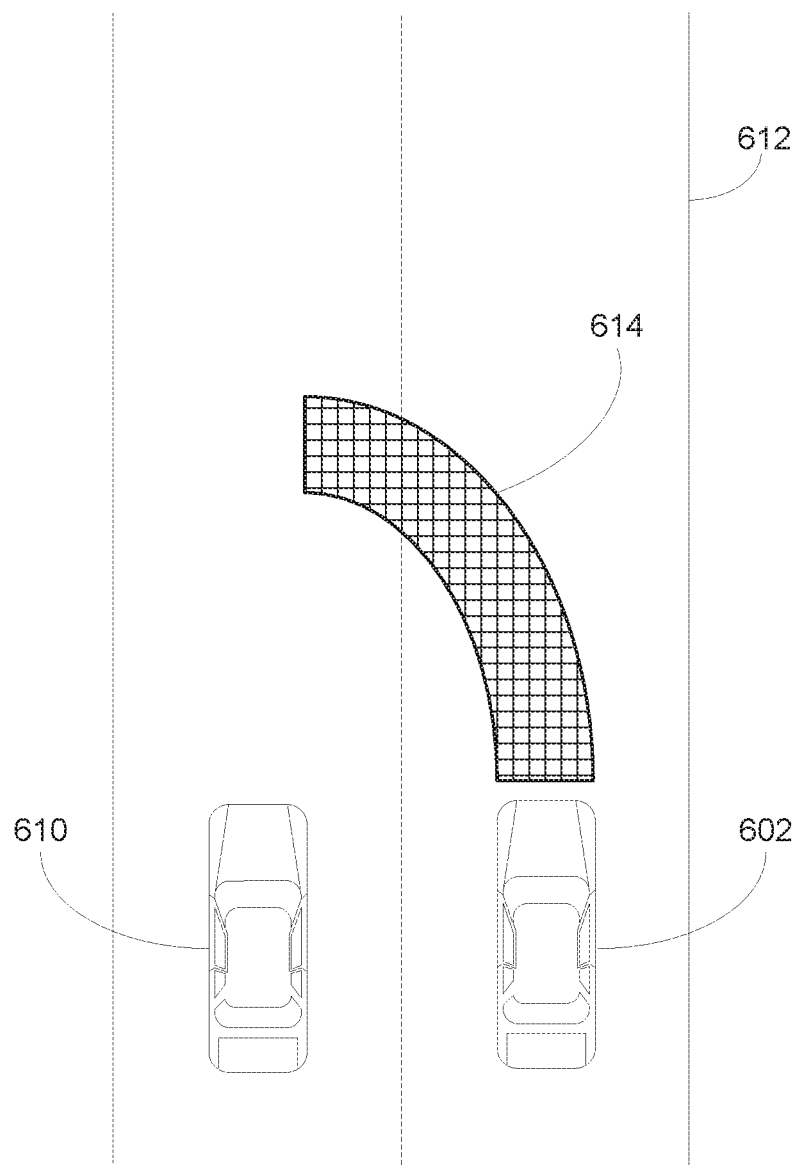

FIG. 6F illustrates an example visualization 614 to indicate an intended lane change or passing maneuver. FIG. 6F illustrates vehicle 602 moving on road 612 and intending to change lanes into a lane to the left and thereby passing in front of another vehicle 610. Vehicle 602 projects a visualization 614 onto road 612 in front of vehicle 602. Visualization 614 includes a curved segment, in front of vehicle 602, that is curved into the lane to the left to indicate the intended path of travel as part of the passing maneuver and is filled with a color predefined to indicate an intended speed increase (e.g., green according to Table 1 above) as part of the passing maneuver.

Figure 6G:
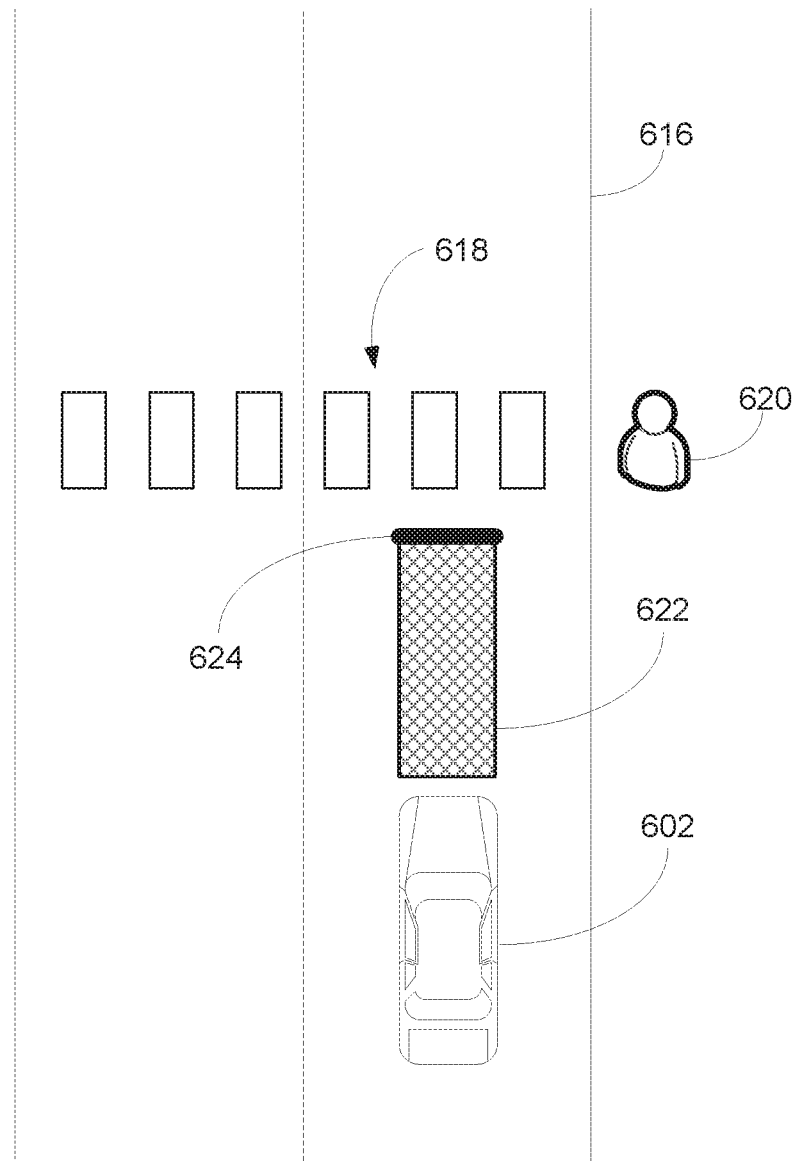

FIG. 6G illustrates an example visualization 622 to indicate an intended stoppage. FIG. 6G illustrates vehicle 602 moving on road 616 and intending to stop at a crosswalk 618 that a pedestrian 620 is waiting to cross. Vehicle 602 projects a visualization 622 onto road 616 in front of vehicle 602. Visualization 622 includes a rectangular region, in front of vehicle 602 and indicating the intended path of vehicle 602, that is filled with a color predefined to indicate an intended speed decrease (e.g., blue according to Table 1 above) as part of the intended stoppage. Visualization 622 further includes a position indicator 624 indicating the position where vehicle 602 intends to come to a stop. Notably, visualization 622 is projected onto road 616 to communicate the intended stoppage to pedestrian 620 waiting to cross, thereby allowing pedestrian 620 to coordinate his or her crossing of crosswalk 618 with the intended stoppage of vehicle 602.

Figure 6H:
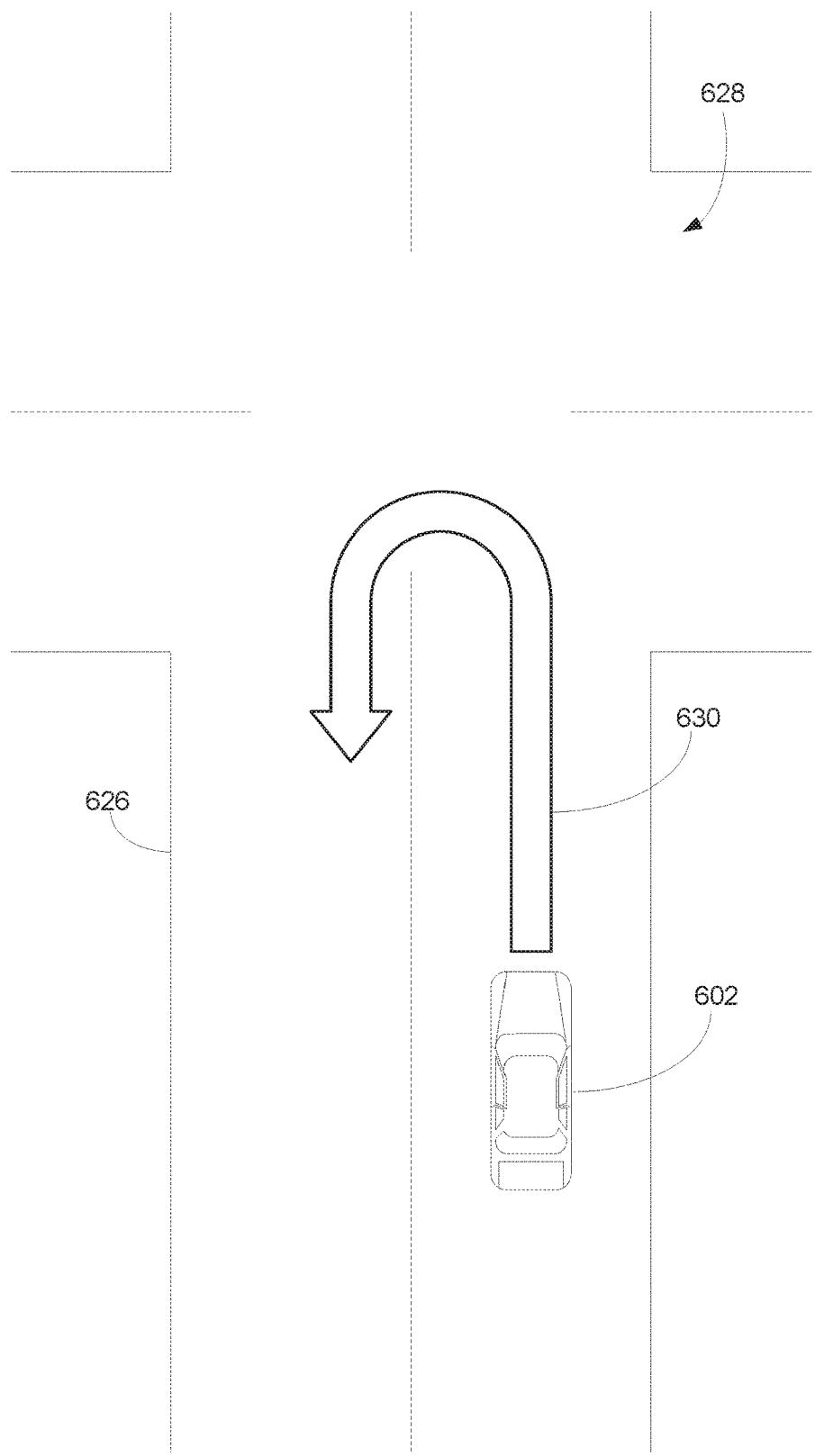

FIG. 6H illustrates an example visualization 630 to indicate an intended U-turn. FIG. 6H illustrates vehicle 602 moving on road 626 and intending to make a U-turn at intersection 628. Vehicle 602 projects a visualization 630 onto road 6626 in front of vehicle 602. Visualization 630 includes an arrow, in front of vehicle 602, that is bent 180 degrees into the lane into which vehicle 602 intends to U-turn.

Figure 7:
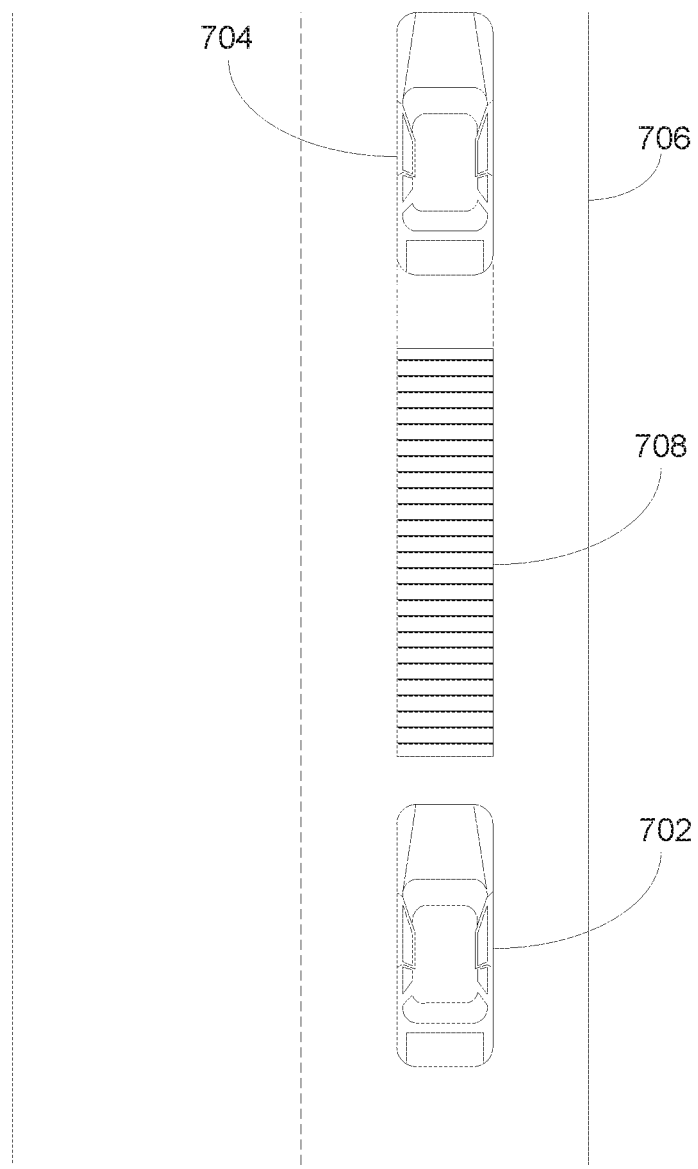
FIG. 7 illustrates an exemplary intent communication scenario where the roadway projection system of FIG. 4 projects a visualization onto a roadway on behalf of another vehicle to communicate an intended driving action of the another vehicle, according to various embodiments.

FIG. 7 illustrates an exemplary intent communication scenario where the roadway projection system of FIG. 4 projects a visualization onto a roadway on behalf of another vehicle to communicate an intended driving action of the another vehicle, according to various embodiments. As shown, vehicles 702 and 704 are travelling on road 706. Vehicle 702 is an AV, and vehicle 704 may be an AV or a conventional vehicle equipped with a roadway projection system. Vehicle 702 intends to maintain a constant speed. Various persons may have interest in knowing the intended action of vehicle 702. For example, nearby pedestrians and/or cyclists (not shown), occupants of vehicles in an adjacent lane (not shown), the driver of vehicle 704, and/or non-driver occupants of vehicle 702 may be interested in knowing the intended action of vehicle 702. Vehicle 702 may communicate information indicating its intent to maintain speed and/or a corresponding visualization to vehicle 704 (e.g., if vehicle 702 is not equipped with a functioning image projector 224), so that vehicle 704 can project the visualization on behalf of vehicle 702. Vehicle 704 receives the information indicating the intent to maintain speed and/or the corresponding visualization. Vehicle 704 projects visualization 708 onto an area on road 706 that is behind vehicle 704 but is ahead of vehicle 702, to indicate the intended path of vehicle 702.

Figure 8:
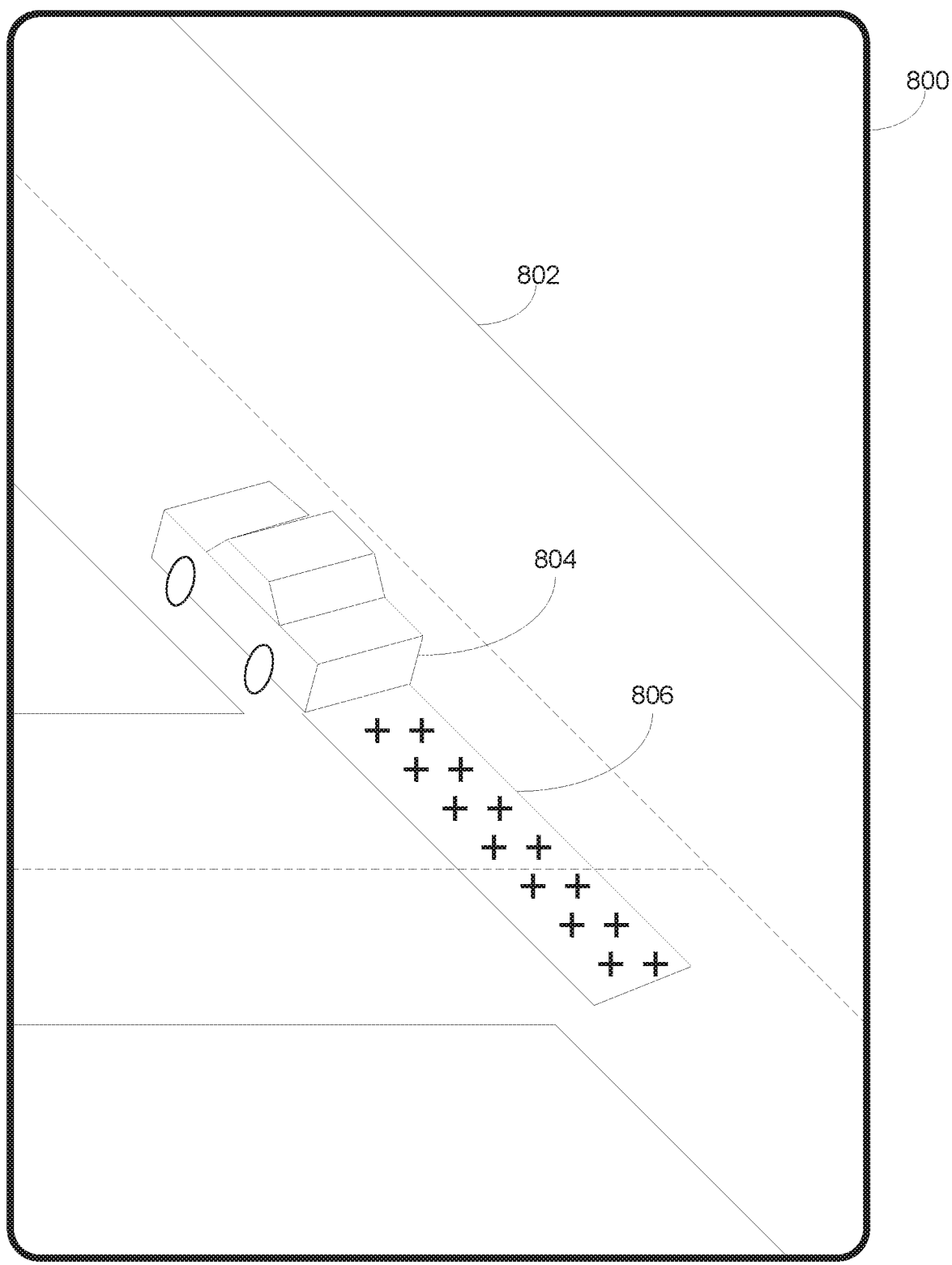
FIG. 8 illustrates an exemplary intent communication scenario where a visualization indicating an intended driving action of a vehicle is displayed on a display of a device, according to various embodiments.

FIG. 8 illustrates an exemplary intent communication scenario where a visualization indicating an intended driving action of a vehicle is displayed on a display of a device, according to various embodiments. FIG. 8 illustrates a display 800 (e.g., display device 226 or 326) of a computing device (e.g., computing device 201 or 301). Display 800 may be, for example and without limitation, a center console display or dashboard display or heads-up display of a vehicle in proximity of vehicle 804, a display on a portable device (e.g., smartphone, tablet) held by a person in proximity of vehicle 804, or a head-mounted display worn by a user in proximity of vehicle 804 (e.g., augmented reality glasses). A live video of AV 804 travelling on road 802 is displayed on display 800. AV 804 intends to increase speed. AV 804 may transmit information and/or a corresponding visualization indicating this intent to nearby computing devices (e.g., if AV 804 is not equipped with an image projector 224), including the computing device that includes display 800. The computing device can generate and/or adjust the visualization, and display the visualization as augmented reality content on the live video of AV 804. Additionally, the visualization 806 moves along with AV 804 on display 800.

Referring generally to FIGS. 6A-8, the different visualizations and intended driving actions discussed in conjunction with those figures and with Table 1 are provided for exemplary purposes only. Other types of visualizations that may be used to indicate intended driving actions, types of intended driving actions that can be indicated with visualizations, and mappings of intended driving actions to types of visualizations, fall within the scope of the various embodiments.

Figure 9:
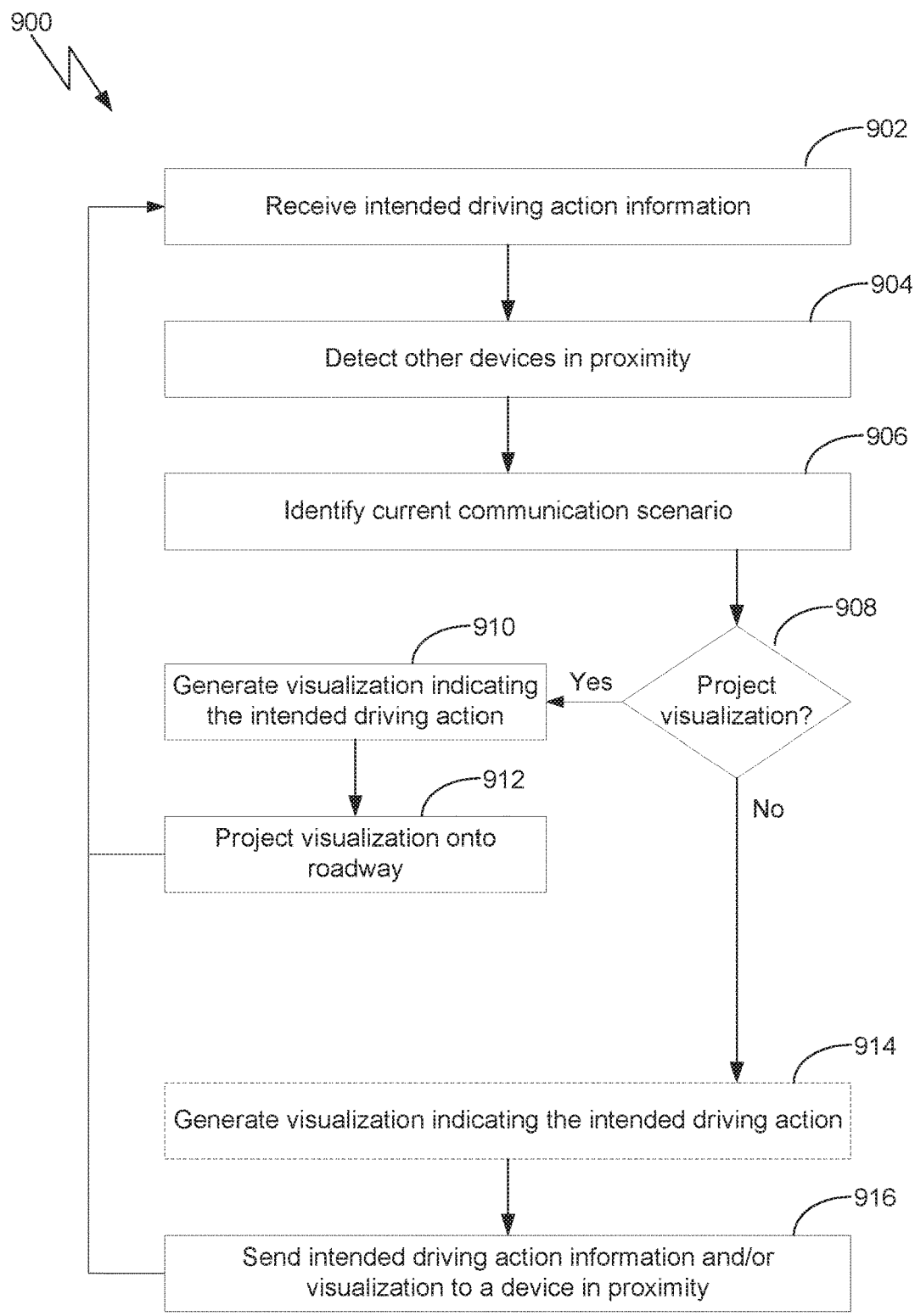
FIG. 9 illustrates a flow diagram of method steps for communicating an intended driving action, according to various embodiments.

FIG. 9 illustrates a flow diagram of method steps for communicating an intended driving action, according to various embodiments. Although the method steps are described with respect to the systems of FIGS. 1-8, persons skilled in the art will understand that any system configured to perform the method steps, in any order, falls within the scope of the various embodiments.

As shown, method 900 begins at step 902, where an intent communication application at an AV receives intended driving action information. At vehicle 106 that is an AV, intent communication application 234 receives information conveying an intended driving action from autonomous driving application 232. Autonomous driving application 232 generates the intended driving actions as part of operating vehicle 106.

At step 904, the intent communication application detects other devices in proximity. Intent communication application 234 at vehicle 106 detects the presence of other computing devices 201 and computing devices 301 in proximity of vehicle 106, particularly devices that can be communicatively coupled with vehicle 106. Intent communication application 234 can detect devices in proximity by broadcasting a message and waiting for acknowledgements. Intent communication application 234 can further query the devices to see whether each of the devices have visualization projection capabilities and/or regions where the devices can project visualizations.

At step 906, the intent communication application identifies a current intent communication scenario of the vehicle. Intent communication application 234 identifies, based at least on sensor data from sensor array 222, various parameters, characteristics, and circumstance that can affect communication of the intended driving action by vehicle 106. For example, intent communication application 234 could identify the terrain ahead, locations of device detected in step 904, locations of pedestrians, the current location and speed of vehicle 106, the presence of any obstacles ahead, locations of intended recipient(s) of a visualization of an intended driving action, and so forth.

At step 908, the intent communication application determines whether the AV will self-project a visualization indicating the intended driving action. If intent communication application 234 determines that vehicle 106 will self-project the visualization, then method 900 proceeds to step 910, where intent communication application 234 generates the visualization indicating the intended driving action of vehicle 106. Intent communication application 234 of vehicle 106 maps the intended driving action to a type of visualization and desired location of the visualization and then generates the visualization based on the mapping. At step 912, the intent communication application projects the visualization onto a roadway. Intent communication application 234 causes image projector 224 of vehicle 106 to project the visualization onto roadway 102. Method 900 then returns to step 902, where the intent communication application can receive further intended driving action information.

If the intent communication application determines that the AV will not self-project the visualization, then method 900 proceeds to optional step 914, where the intent communication application optionally generates a visualization indicating the intended driving action. At step 916, the intent communication application sends the intended driving action information, desired location of the visualization and/or the generated visualization to a device in proximity. Intent communication application 234 can send the intended driving action information and/or the visualization optionally generated in step 914 to a device in proximity, in particular a device detected in step 904. That device can project the visualization onto roadway 102 on behalf of vehicle 106 and/or display the visualization on a display as augmented reality content. Method 900 then returns to step 902, where the intent communication application can receive further intended driving action information.

Figure 10:
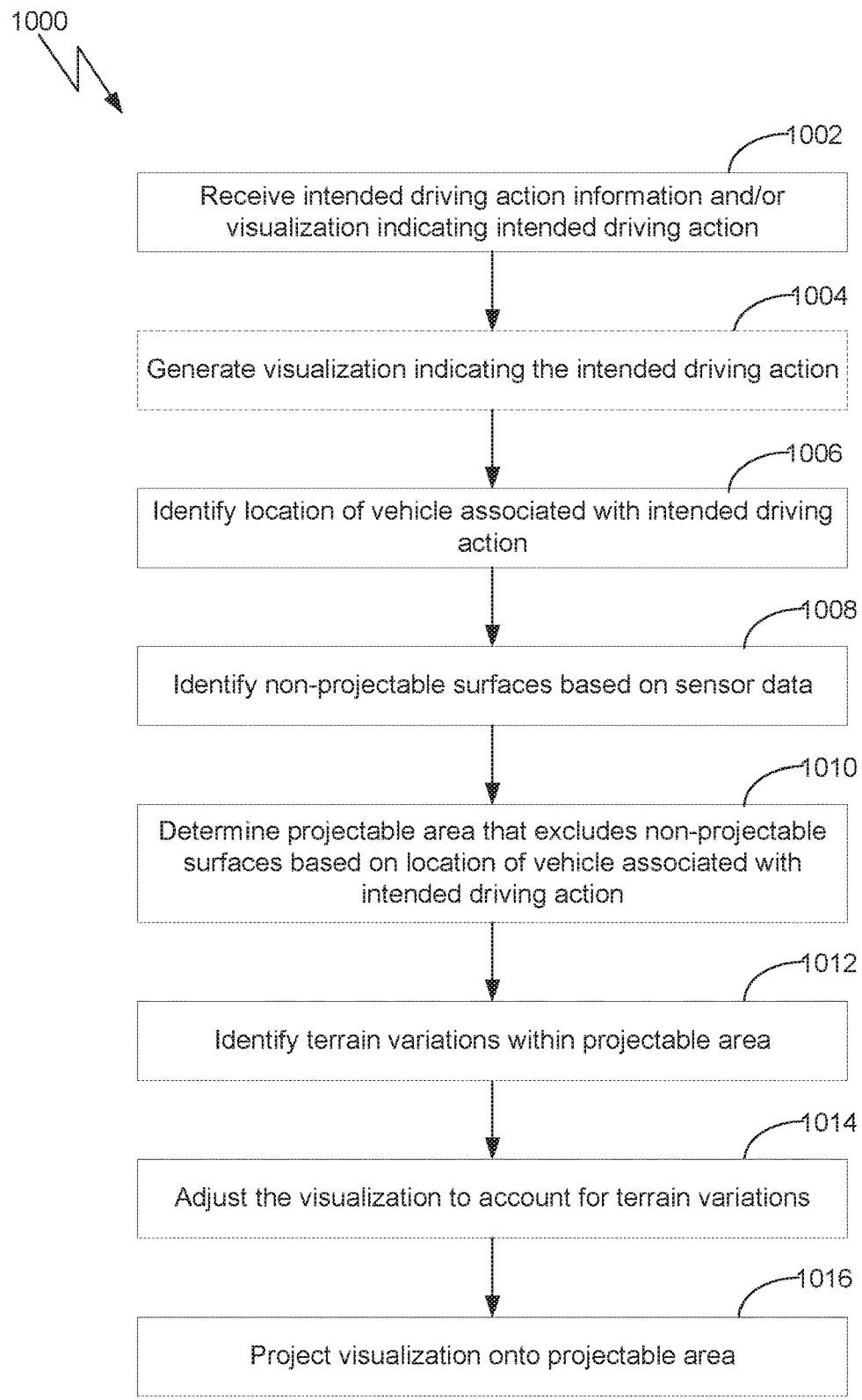
FIG. 10 illustrates a flow diagram of method steps for projecting a visualization indicating an intended driving action, according to various embodiments.

FIG. 10 illustrates a flow diagram of method steps for projecting a visualization indicating an intended driving action, according to various embodiments. Although the method steps are described with respect to the systems of FIGS. 1-9, persons skilled in the art will understand that any system configured to perform the method steps, in any order, falls within the scope of the various embodiments.

As shown, method 1000 begins at step 1002, where an intent communication application receives intended driving action information and/or a visualization indicating the intended driving action. For example, an intent communication application 234 at a vehicle (e.g., vehicle 108, 704) in proximity to an AV (e.g., vehicle 106, 702) receives from the AV information conveying an intended driving action of the AV, a desired location for the visualization, and/or the visualization, generated by the AV, indicating the intended driving action. As another example, intent communication application 234 at the AV (e.g., vehicle 106, 702) receives information conveying an intended driving action from autonomous driving application 232 at the AV.

At optional step 1004, the intent communication application generates a visualization indicating the intended driving action. If intent communication application 234 received just the information conveying the intended driving action in step 1002, then intent communication application 234 can generate a visualization indicating the intended driving action. If intent communication application 234 received the visualization in step 1002, step 1004 may be skipped.

At step 1006, the intent communication application 234 identifies a location of the vehicle associated with the intended driving action. Intent communication application 234 identifies the location of the AV that intends the intended driving action. The location may include a geographical location and/or a location relative to the device at which intent communication application 234 is running.

At step 1008, intent communication application 234 identifies non-projectable surfaces based on sensor data. Intent communication application 234 processes the sensor data and identifies non-projectable surfaces and objects, including retroreflective surfaces, humans, objects on which the projected visualization may be illegible and/or confusing, and so forth. Intent communication application 234 may consult a database of restricted objects onto which images should not be projected, and then implement computer vision techniques to identify non-projectable objects that should be excluded from projectable area 420. Intent communication application 234 may also cause image projector 224 to project a brief test pattern across a panorama around the vehicle in order to cause any highly reflective surfaces in the panorama to momentarily reflect the test pattern. Intent communication application 234 may then identify the highly reflective surfaces that reflected the test pattern as non-projectable objects.

At step 1010, the intent communication application determines a projectable area that excludes the non-projectable surfaces identified at step 1010, based on the location of the vehicle associated with the intended driving action and/or the desired location for the visualization. Intent communication application 234 determines a projectable area 420 that excludes non-projectable surfaces (e.g., obstacles, humans) but that also accounts for the location of the vehicle associated with the intended driving action and/or the desired location for the visualization. For example, if intent communication application 234 at vehicle 108 is determining a projectable area for a projection on behalf of vehicle 106 and vehicle 106 is behind vehicle 108, then the front of vehicle 108 would be excluded from projectable area 420 even if the front of vehicle 108 does not constitute a non-projectable surface; projecting in front of vehicle 108 on behalf of vehicle 106 that is behind would not effectively communicate the intended driving action of vehicle 106.

At step 1012, intent communication application 234 identifies terrain variations within the projectable area determined at step 1012. The terrain variations could be, for example, and without limitation, bumps, dips, hills, a rough driving surface, a wet driving surface, and so forth.

At step 1014, the intent communication application adjusts the visualization to account for the terrain variations identified at step 1012. Intent communication application 234 can adjust the generated or received visualization to account for terrain variations. At step 1016, the intent communication application projects the visualization onto the projectable area. Intent communication application 234 causes an image projector 224 to project the visualization onto at least a portion of projectable area 420. Intent communication application 234 may then repeat the method 1000 to project additional visualizations indicating intended driving actions.

Visualizations may be displayed on a display via a method similar to method 1000. Intent communication application 234 or 334 at a device receives intended driving action information and/or a visualization, and optionally generates a visualization if needed. Intent communication application 234 or 334 captures images (e.g., live video) of the AV associated with the intended driving action. Intent communication application 234 or 334 causes the images of the AV and the visualization to be displayed on a display (e.g., display device 226 or 326), such as shown in the example of FIG. 8.

In sum, a vehicle action communication system associated with an autonomous vehicle is configured to obtain information indicating an intended action of the autonomous vehicle and to present content communicating that intended action outside of the autonomous vehicle. The vehicle action communication system may include a roadway projection system integrated with the autonomous vehicle. The vehicle action communication system may include, additionally or alternatively, roadway projection systems integrated with other vehicles in proximity of the autonomous vehicle and/or computing devices in proximity of the autonomous vehicle. The vehicle action communication system is further configured to determine which of the autonomous vehicle projection system, a nearby vehicle projection system, and/or a nearby computing device would present the content. The content communicating the intended action could be, for example, and without limitation, images projected onto the roadway and/or extended reality content displayed on a personal computing device. Intended actions that may be communicated could include, for example, and without limitation, an upcoming speed change, an upcoming stoppage, and/or an upcoming maneuver.

A technical advantage and improvement of the disclosed techniques is that intended actions of an autonomous vehicle on the road are communicated to human drivers and pedestrians in proximity. Accordingly, the human drivers and pedestrians can coordinate their actions with the intended actions of the autonomous vehicle, thereby facilitating more effective sharing of the road between humans and autonomous vehicles. Another technical advantage and improvement is that the intended actions may be communicated by in-proximity vehicles and/or devices, in addition or alternatively to the autonomous vehicle. This increased the communication capability of the system and facilitates more effective communication of the intended actions.

1. In some embodiments, a computer-implemented method comprises receiving an intended driving action associated with an autonomous vehicle; determining an intent communication scenario associated with the autonomous vehicle; and based on the intent communication scenario, causing a visualization indicating the intended driving action to be projected onto a roadway.

2. The method of clause 1, wherein causing the visualization to be projected onto the roadway comprises causing the autonomous vehicle to project the visualization onto the roadway.

3. The method of clauses 1 or 2, wherein determining the intent communication scenario comprises identifying a terrain of the roadway.

4. The method of any of clauses 1-3, wherein causing the visualization to be projected onto the roadway comprises adjusting the visualization based on the terrain of the roadway.

5. The method of any of clauses 1-4, wherein determining the intent communication scenario comprises detecting a computing device in proximity to the autonomous vehicle.

6. The method of any of clauses 1-5, wherein the computing device is associated with a second vehicle, and wherein causing the visualization to be projected onto the roadway comprises transmitting information associated with the intended driving action to the computing device, wherein the computing device is configured to project the visualization onto the roadway.

7. The method of any of clauses 1-6, wherein the information comprises data corresponding to the visualization.

8. The method of any of clauses 1-7, wherein the information comprises a location onto which the visualization is to be projected.

9. The method of any of clauses 1-8, further comprising transmitting information associated with the intended driving action to the computing device, wherein the computing device is configured to display the visualization on a display device as extended reality content in conjunction with an image of the autonomous vehicle.

10. The method of any of clauses 1-9, further comprising mapping the intended driving action to a type of the visualization.

11. In some embodiments, a system comprises an image projector; a memory storing an application; and a processor that, when executing the application, is configured to receive an intended driving action associated with an autonomous vehicle; determine an intent communication scenario associated with the autonomous vehicle; and based on the intent communication scenario, projecting onto a roadway, via the image projector, a visualization indicating the intended driving action.

12. The system of clause 11, wherein determining the intent communication scenario comprises identifying a terrain of the roadway.

13. The system of clauses 11 or 12, wherein projecting the visualization comprises adjusting the visualization based on the terrain of the roadway.

14. The system of any of clauses 11-13, wherein determining the intent communication scenario comprises identifying one or more non-projectable surfaces.

15. The system of any of clauses 11-14, wherein projecting the visualization comprises projecting the visualization onto an area on the roadway that avoids the one or more non-projectable surfaces.

16. The system of any of clauses 11-15, projecting the visualization comprises projecting the visualization based at least one of a location or an orientation of a human in proximity.

17. The system of any of clauses 11-16, wherein the system is remote from the autonomous vehicle, and wherein projecting the visualization comprises projecting the visualization based on a location of the autonomous vehicle.

18. In some embodiments, one or more non-transitory computer-readable storage media include instructions that, when executed by one or more processors, cause the one or more processors to perform the steps of receiving an intended driving action associated with an autonomous vehicle; determining an intent communication scenario associated with the autonomous vehicle; and based on the intent communication scenario, causing a visualization indicating the intended driving action to be projected onto a roadway.

19. The one or more non-transitory computer-readable storage media of clause 18, wherein causing the visualization to be projected onto the roadway comprises detecting a projection system in proximity of and remote from the autonomous vehicle; and transmitting information associated with the intended driving action to the projection system, wherein the projection system is configured to project the visualization onto the roadway.

20. The one or more non-transitory computer-readable storage media of clauses 18 or 19, wherein the steps further comprise transmitting information associated with the intended driving action to a computing device in proximity of and remote from the autonomous vehicle, wherein the computing device is configured to display the visualization on a display device as extended reality content in conjunction with an image of the autonomous vehicle.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   receiving an intended driving action associated with an autonomous vehicle;
   determining an intent communication scenario associated with the autonomous vehicle;
   generating, based on a mapping that maps different intended driving actions to different types of visualizations to be projected onto a roadway, a visualization that indicates the intended driving action; and
   based on the intent communication scenario, causing the visualization indicating the intended driving action to be projected onto the roadway by a computing device that is separate from the autonomous vehicle.

2. The method of claim 1, wherein causing the visualization to be projected onto the roadway comprises causing the autonomous vehicle to project the visualization onto the roadway.

3. The method of claim 1, wherein determining the intent communication scenario comprises identifying a terrain of the roadway.

4. The method of claim 3, wherein causing the visualization to be projected onto the roadway comprises adjusting the visualization based on the terrain of the roadway.

5. The method of claim 1, wherein determining the intent communication scenario comprises detecting that the computing device is in proximity to the autonomous vehicle.

6. The method of claim 5, wherein the computing device is associated with a second vehicle, and wherein causing the visualization to be projected onto the roadway comprises transmitting information associated with the intended driving action to the computing device.

7. The method of claim 6, wherein the information comprises data corresponding to the visualization.

8. The method of claim 6, wherein the information comprises a location onto which the visualization is to be projected.

9. The method of claim 5, further comprising transmitting information associated with the intended driving action to the computing device, wherein the computing device is configured to display the visualization on a display device as extended reality content in conjunction with an image of the autonomous vehicle.

10. The method of claim 1, further comprising mapping the intended driving action to a type of the visualization.

11. A system, comprising:
    a memory storing an application; and
    a processor that, when executing the application, is configured to:
       receive an intended driving action associated with an autonomous vehicle;
       determine an intent communication scenario associated with the autonomous vehicle;
       generate, based on a mapping that maps different intended driving actions to different types of visualizations to be projected onto a roadway, a visualization that indicates the intended driving action; and
       based on the intent communication scenario, projecting onto the roadway, via an image projector of a computing device that is separate from the autonomous vehicle, the visualization indicating the intended driving action.

12. The system of claim 11, wherein determining the intent communication scenario comprises identifying a terrain of the roadway.

13. The system of claim 12, wherein projecting the visualization comprises adjusting the visualization based on the terrain of the roadway.

14. The system of claim 11, wherein determining the intent communication scenario comprises identifying one or more non-projectable surfaces.

15. The system of claim 14, wherein projecting the visualization comprises projecting the visualization onto an area on the roadway that avoids the one or more non-projectable surfaces.

16. The system of claim 11, projecting the visualization comprises projecting the visualization based at least one of a location or an orientation of a human in proximity.

17. The system of claim 11, wherein the system is remote from the autonomous vehicle, and wherein projecting the visualization comprises projecting the visualization based on a location of the autonomous vehicle.

18. One or more non-transitory computer-readable storage media including instructions that, when executed by one or more processors, cause the one or more processors to perform the steps of:
    receiving an intended driving action associated with an autonomous vehicle;
    determining an intent communication scenario associated with the autonomous vehicle;
    generating, based on a mapping that maps different intended driving actions to different types of visualizations to be projected onto a roadway, a visualization that indicates the intended driving action; and
    based on the intent communication scenario, causing the visualization indicating the intended driving action to be projected onto the roadway by a computing device that is separate from the autonomous vehicle.

19. The one or more non-transitory computer-readable storage media of claim 18, wherein causing the visualization to be projected onto the roadway comprises:
   detecting a projection system in proximity of and remote from the autonomous vehicle; and
   transmitting information associated with the intended driving action to the projection system, wherein the projection system is configured to project the visualization onto the roadway.

20. The one or more non-transitory computer-readable storage media of claim 18, wherein the steps further comprise:
   transmitting information associated with the intended driving action to the computing device, wherein the computing device is configured to display the visualization on a display device as extended reality content in conjunction with an image of the autonomous vehicle.

* * * * *